United States Patent [19]
Eda et al.

[11] Patent Number: 5,482,127
[45] Date of Patent: Jan. 9, 1996

[54] ELECTRIC POWER STEERING DEVICE

[75] Inventors: Hiroshi Eda; Hironobu Shiono; Isamu Chikuma, all of Maebashi, Japan

[73] Assignee: NSK Ltd., Tokyo, Japan

[21] Appl. No.: 251,946

[22] Filed: Jun. 1, 1994

[30] Foreign Application Priority Data

| Jun. 1, 1993 | [JP] | Japan | 5-029057 U |
| Dec. 13, 1993 | [JP] | Japan | 5-066258 U |

[51] Int. Cl.$^6$ ............................................ B62D 5/04
[52] U.S. Cl. ........................... 180/79.1; 74/388 PS
[58] Field of Search ................... 180/79.10, 79; 74/388 PS

[56] References Cited

U.S. PATENT DOCUMENTS

| 3,091,951 | 6/1963 | Onyskin | 464/30 |
| 5,355,315 | 10/1994 | Daido et al. | 180/79.1 X |

FOREIGN PATENT DOCUMENTS

| 0535422 | 4/1993 | European Pat. Off. |
| 534161 | 9/1931 | Germany. |
| 6-39664 | 5/1994 | Japan. |

*Primary Examiner*—Kevin T. Hurley
*Attorney, Agent, or Firm*—Shapiro and Shapiro

[57] ABSTRACT

A power transmission device, having a frictional face and a pressure member pressed to the frictional face, is provided between the rotary shaft of a motor and a reducing mechanism of an electric power steering device, so that the power transmission is achieved utilizing a frictional force generated between the frictional face and the pressure member, before the output torque of the motor is amplified by the reducing mechanism. Consequently the power transmission device can be made simple and compact in configuration, as it is not necessary to increase the pressing force of the pressure member nor to increase the area of the frictional face.

3 Claims, 3 Drawing Sheets

ELECTRIC POWER STEERING DEVICE

BACKGROUND OF THE INVENTION

1. Field of the Invention

The present invention relates to an electric power steering device.

2. Related Background Art

In the field of electric power steering devices for a vehicle, there is known a configuration in which the rotary output of an electric motor, providing auxiliary steering torque, is reduced in speed by means of gears, thereby transmitting appropriate torque and speed to the output shaft of the steering mechanism. In such electric power steering device, while the device is in action, an abrupt force received by the wheels from the road may act as an impact force against the output of the electric motor, and such impact force may cause damage in the electric motor or in the power transmission mechanism.

For reducing or avoiding such impact force, there have conventionally been adopted certain measures such as:

1) a slidable mechanism utilizing frictional force, provided on the output shaft of the steering mechanism and serving as a torque limiter causing a sliding motion under an excessive torque (Japanese Utility Model Application No. 4-75506); or
2) a magnetic clutch serving as a torque limiter, provided on the rotary shaft.

However, in such conventional electric power steering devices;

in the structure 1) mentioned above, as the output of the electric motor is transmitted to the output shaft ordinarily through a reducing (torque increasing) mechanism, the frictional force utilized in the slidable mechanism attached to the output shaft has to be made considerably large in order to transmit thus increased torque. For this reason it is associated with a drawback of requiring a strict load control in order to obtain a constant frictional force; and in the structure 2) mentioned above, the magnetic clutch requires constant supply of electric power. For this reason it is associated with drawbacks in terms of energy saving, and the solenoid of the magnetic clutch has to be made considerably large if the rated output of the electric motor becomes larger.

SUMMARY OF THE INVENTION

In consideration of the foregoing, an object of the present invention is to provide an electric power steering device capable of preventing damage in the electric motor or in the power transmission system, with a simple configuration.

The above-mentioned object can be attained, according to the present invention, by an electric power steering device comprising:

a housing;

a motor mounted on said housing and having a rotary shaft;

an output shaft connected to a steering mechanism for steering wheels;

a reducing mechanism provided between said rotary shaft and said output shaft; and power transmission means provided between the rotary shaft of said motor and said reducing mechanism and adapted to transmit the power;

wherein said power transmission means includes a frictional face and pressure means pressed to said frictional face and is adapted to effect power transmission utilizing a frictional force generated between said frictional face and said pressure means, wherein wherein said frictional force is so selected as to be larger than the output ordinarily transmitted from said motor but smaller than the impact force generated between said motor and said wheels.

According to the electric power steering device of the present invention, as the power transmission means having the frictional face and pressure means pressed to said frictional face is provided between the rotary shaft of said motor and said reducing mechanism, the power transmission is achieved utilizing a relatively small frictional force generated between said frictional face and said pressure means, before the output torque of said motor is increased by said reducing mechanism. Consequently the power transmission means can be made simple and compact in configuration, as it is not necessary to increase the pressing force of the pressure means nor to increase the area of said frictional face.

The above-mentioned object can also be attained, according to the present invention, by an electric power steering device comprising:

a housing;

a motor mounted on said housing and having a rotary shaft;

an output shaft connected .to a steering mechanism for steering wheels;

a reducing mechanism connected to said output shaft, also provided with an input member and adapted to transmit power in reducing manner from said input shaft to said output shaft; and power transmission means provided between the rotary shaft of said motor and the input member of said reducing mechanism, and adapted to effect power transmission;

wherein said power transmission means includes a friction plate which is incapable of relative rotation to either of said rotary shaft and said input member but is axially movable relative hereto, a receiving member so mounted on the other of said rotary shaft and said input member as to be incapable of relative rotation thereto, and a pressure member for pressing said friction plate to said receiving member;

the power transmission is achieved by the frictional force generated between said frictional plate and said receiving member; and said frictional force is so selected as to be larger than the output ordinarily transmitted from said motor but smaller than the impact force generated between said motor and said wheels.

According to the electric power steering device of the present invention, as the power transmission means having the frictional face and pressure means pressed to said frictional face is provided between the rotary shaft of said motor and said reducing mechanism, the power transmission is achieved utilizing a relatively small frictional force generated between said frictional face and said pressure means, before the output torque of said motor is increased by said reducing mechanism. Consequently the power transmission means can be made simple and compact in configuration, as it is not necessary to increase the pressing force of the pressure means nor to increase the area of said frictional face.

DETAILED DESCRIPTION OF THE PREFERRED EMBODIMENTS

Now the present invention will be described in detail with reference to the preferred embodiments thereof shown in the attached drawings.

Figure 1:
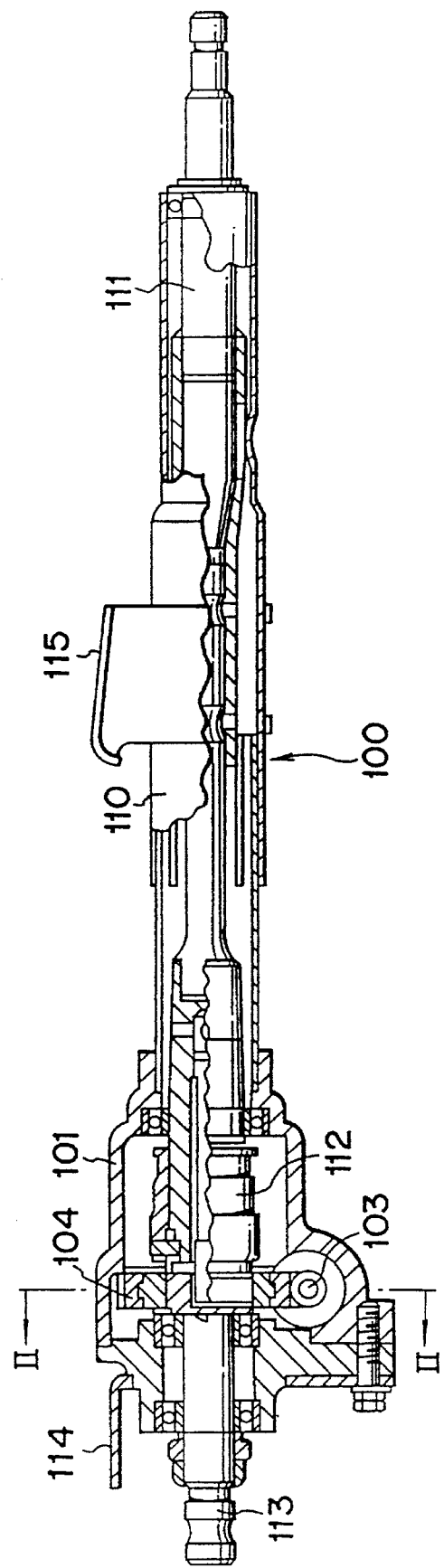
FIG. 1 is a longitudinally partially cut-off lateral view of an electric power steering device 100 constituting an embodiment of the present invention.

FIG. 1 is a longitudinally partially cut-off lateral view of an electric power steering device 100 constituting an embodiment of the present invention.

Referring to FIG. 1, the electric power steering device 100 is composed of a housing 101 and a tube 110 extending therefrom. The housing 101 and a tube 110 are respectively fixed to a vehicle body (not shown) by brackets 114 and 115. Inside the tube 110 there is extended an input shaft 111, which is to be connected at an end thereof to a steering wheel (not shown) and is supported rotatably with respect to the tube 110. The other end of the input shaft 111 is connected to a torque detecting device 112.

The torque detecting device 112 is also connected to a transmission shaft 113 extended in the housing 101 and supported rotatably. The transmission shaft 113 is connected to a steering mechanism (not shown and serves to) transmit the torque for steering the wheels. The torque detecting device 112 is provided to detect the relative torque between the input shaft 111 and the transmission shaft 113 thereby suitably controlling the auxiliary steering force, but the details of such device will not be explained as the configuration thereof is already well known.

In the vicinity of the torque detecting device 112, the transmission shaft 113 is arranged coaxially with a worm wheel 104, engaging with a worm gear 103a (cf. FIG. 2) of an output shaft 103 extending perpendicularly to the plane of FIG. 1. The output shaft 103 is connected to the rotary shaft of a motor 102 (cf. FIG. 2).

In the following there will be explained the function of the electric power steering device 100 shown in FIG. 1. In response to the entry of a steering torque from the steering wheel, the input shaft 111 rotates to transmit the rotary torque to the transmission shaft 113 through the torque detecting device 112. The transmission shaft is connected, as mentioned above, to the steering mechanism (not shown) and transmits the steering torque thereto. In this state the torque detected by the torque detecting device 112 is supplied to a discrimination circuit (not shown) and is compared with a predetermined value therein. If said torque exceeds the predetermined value, the auxiliary steering force is required, so that a driving command is output to drive the motor 102. The motor 102 activated by the driving command rotates the output shaft 103, thereby transmitting the rotary torque through the worm wheel 104.

When the torque detected by the torque detecting device 112 is lower than the predetermined value, the auxiliary steering force is not required so that the motor 102 is not activated.

Figure 2:
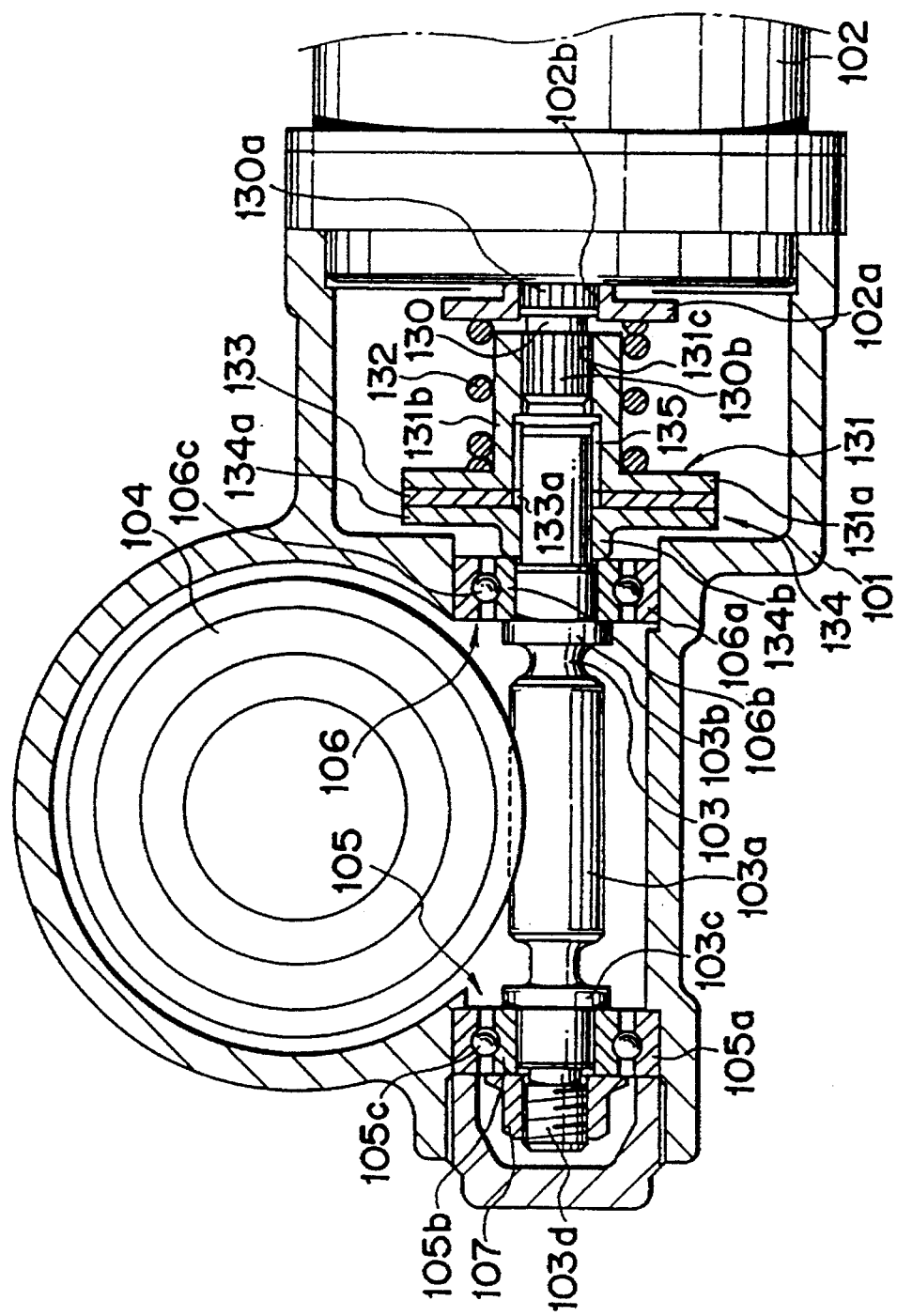
FIG. 2 is a cross-sectional view of the device shown in FIG. 1, along a plane II—II therein and seen in the axial direction.

FIG. 2 is a cross-sectional view, seen in the axial direction, along a plane II—II in FIG. 1. Referring to FIG. 2, the electric motor 102 is mounted at the right-hand end of the housing 101, and a flange 102a integrally rotating with the rotary shaft (not shown) of the electric motor 102 is provided with a female serrated portion 102b. A first transmission shaft 130, having a male serrated portion 130a at an end, is coaxially connected to said flange portion 102a by the engagement of said serrated portions. The first transmission shaft 130 is provided, at the other end thereof, with a male spline 130b.

A pressure member 131, formed by coaxial connection of a disk portion 131a and a cylindrical portion 131b, is provided with a female spline 131c inside the cylindrical portion 131b, and the pressure member 131 and the first transmission shaft 130 are coaxially connected by the mutual engagement of said female spline 131c with the male spline 130b of the first transmission shaft 130. Around the pressure member 131 there is provided a coil spring 132, of which ends respectively impinge on the flange portion 102a and the disk portion 131b, pressing the two apart. In order to suitably adjust the biasing force of the coil spring 131, there may be provided a spacer between the flange portion 102a and the coil spring 132.

An opposed member 134, similar in shape to the pressure member 131 formed by coaxial connection of a disk portion 134a and a cylindrical portion 134b, is so positioned that said disk portions 134a and 131a are mutually opposed, with a friction plate 133 having frictional faces therebetween. The friction plate 133 is provided with a circular hole 133a. The pressure member 131, the coil spring 132 and the opposed member 134 constitute the pressure means.

A second transmission shaft 103, coaxial with the first transmission shaft 130, is rotatably supported by bearings 105, 106, positioned in the vicinity of both ends of the housing 101. The bearings 105, 106 are respectively provided with outer rings 105a, 106a, inner rings 105b, 106b and plural balls 105c, 106c supported between the corresponding rings. A part of the second transmission shaft 103 extends in the cylindrical portion 134b of the opposed member 134, the circular hole of the friction plate 133 and the cylindrical portion 131b of the pressure member 131, and is mounted to the cylindrical portion 134b so as to be incapable of rotation relative thereto (for examples, by a key), but is rotatably supported with respect to the cylindrical portion 131b through a bushing 135. The end of the cylindrical portion 134b impinges on the inner ring 106b of the bearing 106.

The second transmission shaft 103 is provided with a flange portion 103c in contact with the inner side of the bearing 105, a flange portion 103b in contact with the bearing 106, and a worm gear 103a positioned between said flange portions and meshing with a worm wheel 104. At an end of the second transmission shaft 103, opposite to the motor, there is formed a threaded portion 103d engaging with a nut 107, and the inner ring 105b of the bearing 105 is sandwiched between the flange portion 103c and the nut 107. The worm wheel 104 and the worm gear 103a constitute the reducing mechanism.

In the following there will be explained the function of the pressure means of the present embodiment.

In the normal operation, the rotary torque generated by the motor 102 is transmitted through the first output shaft 130 to the pressure member 131, which is urged in a direction to press the friction plate 133, under the biasing force of the coil spring 132. Consequently the friction plate 133 is compressed between the pressure member 131 and the opposed member 134, thereby generating a frictional force corresponding to the pressing force. As the biasing force of the coil spring 132 is so selected that said frictional force is normally larger than the torque generated by the motor 102, the pressure member 131 and the opposed member 134 rotate integrally in the normal operation. The torque transmitted to the opposed member 134 rotates the worm wheel 104 through the worm gear 103a of the second transmission shaft 103, and is further transmitted to the steering mechanism to achieve steering operation.

However, the wheel may receive an impact force by the surface irregularities of the road. In a conventional system, the impact force is inversely transmitted to the motor 102 through the power transmission system, thereby counteracting the output of the motor. Such counteraction generates an excessively large stress in the power transmission system, eventually leading to the destruction of the component parts.

In the electric power steering device of the present invention, however, as the biasing force of the coil spring 132 is so selected that the frictional force generated between the pressure member 131 and the friction plate 133 becomes smaller than the above-mentioned impact force, there is generated a sliding motion between the friction plate 133 and the pressure member 134 in response to the generation of said impact force. Damage to the power transmission system can thus be prevented, as the impact force can be substantially absorbed by said sliding motion.

Also advantageously, in the electric power steering device of the present embodiment, the cylindrical portion 134b of the opposed member 134 is in impingement on the inner ring of the bearing 103 fitted on the second transmission shaft 103. Consequently, as the inner ring 105b of the bearing 105 is pressed by the transmission shaft 103 to the left, in FIG. 2, under the biasing force of the coil spring 132 received by the opposed member 134, said inner ring 105b presses the outer ring 105a through the balls 105c, thereby eliminating the play in the bearing 105 and ensuring smooth rotation of the second output shaft 103.

The present invention has been explained by reference to an embodiment thereof, but the present invention is naturally not limited to such embodiment and is subject to suitable modifications and variations. As an example, the coil spring 132 may be replaced by a dish spring.

As explained in the foregoing, in the electric power steering device of the present invention, the power transmission means having a frictional face and pressure means pressed to said frictional face is provided between the rotary shaft of the motor and the reducing mechanism, so that the power transmission is achieved utilizing the relatively small frictional force generated between said frictional face and said pressure means before the output torque of said motor is amplified by said reducing mechanism. Consequently the power transmission means can be made simple and compact in configuration, as it is not necessary to increase the pressing force of the pressure means nor to increase the area of the frictional face.

It is also possible to eliminate the play in the bearing by the pressing force of the pressure means, so that a separate play eliminating mechanism can be dispensed with.

Figure 3:
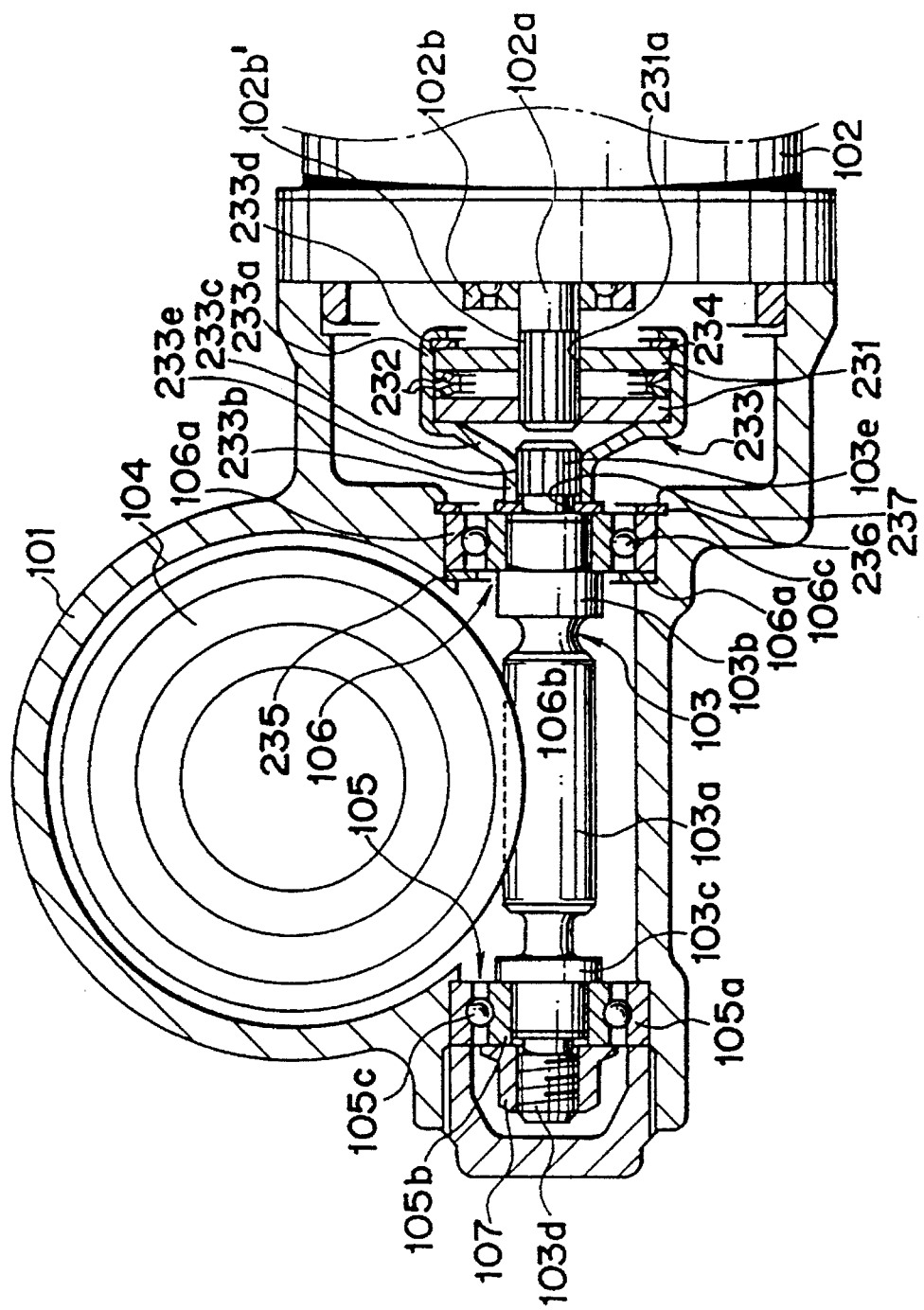
FIG. 3 is a cross-sectional view, similar to FIG. 2, of another embodiment of the present invention.

FIG. 3 is a cross-sectional view of another embodiment, cut along a plane II—II shown in FIG. 1 and seen in the axial direction as in FIG. 2. Referring to FIG. 3, an electric motor 102 is mounted at the right-hand end of a housing 101, and a rotary shaft 102a of the electric motor 102, rotatably supported by a bearing 102b, is provided, at the external end, with a male spline 102b', around which are mounted two annular friction plates 231. The friction plates 231 are provided, in the central apertures thereof, with female spline grooves 231a engaging with the male spline grooves 102b' of the rotary shaft, whereby said friction plates 231 are rendered incapable of rotation relative to the rotary shaft 102 but capable of movement in the axial direction thereof.

Surroundings the friction plates 231 there is provided a friction plate housing 233, which has a hollow structure and is composed of a large diameter portion 233a and a small diameter portion 233b, mutually connected by a conical portion 233c. The internal diameter of the large diameter portion 233a is selected slightly larger than the external periphery of the friction plates 231, in order not to hinder the axial movement thereof.

Around the rotary shaft 102 there are provided two dish-shaped springs 232, positioned mutually back to back, between and in contact with the two friction plates 231. A peripheral groove 233d is formed on the internal periphery of the friction plate housing 233, in the vicinity of the external periphery of the friction plate 231 closer to the electric motor. Inside said peripheral groove 233d, there is provided a pressing plate 234, which is mounted therein by caulking an end of the friction plate housing. The pressing plate 234 and the conical portion 233c support the friction plates 231 therebetwewen so as to maintain the distance of said plates at a predetermined value, with the biasing force of the dish-shaped springs 232 at a reference value or higher. The friction plate housing 233 and the pressing plate 234 constitute a receiving member, while the dish-shaped springs 232 constitute a pressure member.

A reducer input shaft 103, coaxial with the rotary shaft 102a of the electric motor 102, is rotatably supported by bearings 105, 106 positioned in the vicinity of ends of the housing 101. At an end of said reducer input shaft 103, closer to the electric motor, there is formed a male spline 103e engaging with a female spline 233e formed on the internal periphery of the small diameter portion 233b of the friction plate housing 233, whereby the friction plate housing 233 is mounted to the reducer input shaft 103 so as to be incapable of rotation relative thereto but capable of movement in the axial direction. The end of the small diameter portion 233b of the friction plate housing 233 impinges on an intermediate seat 237, thereby being prevented from further movement in the axial direction. The bearings 105, 106 are respectively provided with outer rings 105a, 106a, inner rings 105b, 106b and plural balls 105c, 106c supported between the corresponding rings. At a side of the bearing 106, opposite to the electric motor (at the side of the worm gear), there is provided an intermediate seat 235, between a stepped portion of the housing 101 and the outer ring 106a of the bearing 106. Also at a side, closer to the electric motor, of the bearing 106, a snap ring 236 is inserted in the peripheral groove of the housing, whereby the bearing 106, being sandwiched between the intermediate seat 235 and said snap ring 236, is prevented from axial movement.

The reducer input shaft 103 is provided with a flange portion 103c in contact with the inner side of the bearing 105, a flange portion 103b in contact with the bearing 106, and a worm gear 103a positioned between said flange portions and meshing with a worm wheel 104. At an end, opposite to the motor, of the reducer input shaft 103, there is formed a male thread 103d engaging with a nut 107, and the inner ring 105b of the bearing 105 is supported between the flange portion 103c and the nut 107. The worm wheel 104 and the worm gear 103a constitute the reducing mechanism.

In the following there will be explained the function of the pressure means of the present invention embodiment.

In the normal operation, the rotary torque generated by the motor 102 is transmitted, through the rotary shaft 102a, to the friction plates 231. As explained in the foregoing, the two friction plates 231 are biased mutually apart, by the dish-shaped springs 232, respectively toward the pressing plate 234 and the friction plate housing 233. Consequently the friction plates 231 are compressed between the dish-shaped springs 232 and the pressing plate 234 or the friction plate housing 233, thereby generating a frictional force corresponding to the pressing force. As the biasing force of the dish-shaped springs 232 and the distance of the friction plates 231 are so selected that said frictional force becomes larger than the torque generated by the motor 102 in the normal operation, the friction plates 231 and the friction plate housing 233 rotate integrally in the normal state. The torque transmitted to the friction plate housing 233 rotates the worm wheel 104 through the worm gear 103a of the reducer input shaft 103, and is further transmitted to the steering mechanism, thereby achieving the steering operation.

However, the wheel may receive an impact force by the surface irregularities of the road. In a conventional system, the impact force is inversely transmitted to the motor 102 through the power transmission system, thereby counteracting the output of the motor. Such counteraction generates an excessively large stress in the power transmission system, eventually leading to the destruction of the component parts.

In the electric power steering device of the present invention, however, as the biasing force of the dish-shaped springs 232 is so selected that the frictional force generated between the friction plates 231 and the pressing plate 234, and the friction plate housing 233 becomes smaller than said impact force, there is generated a sliding motion between the friction plate 231 and the pressing plate 234 or the friction plate housing 233. Damage to the power transmission system can be prevented, as the impact force can be substantially absorbed by said sliding motion.

Also advantageously in the electric power steering device of the present embodiment, the biasing force given to the friction plates 231 from the dish-shaped springs 232 is entirely received by the friction plate housing 233. By contrast, configuration of biasing the friction plate against the housing results in a drawback of generation of a thrust force in the reducer input shaft, thereby increasing the rolling resistance of the bearing. The configuration of the present embodiment is free from the thrust force resulting from the biasing of the friction plates, in the bearing 102b supporting the rotary shaft 102a of the electric motor 102 or in the bearings 105, 106 supporting the reducer input shaft 103. Consequently, in the present embodiment, the rolling resistance about the shaft is lowered, so that the returning ability of the steering wheel is improved. Also the present embodiment employing two friction plates 231 can improve the power transmitting ability or can reduce the plate diameter, in comparison with the configuration employing only one friction plate. The presence of two friction plates additionally allows transmission of a sufficiently high torque, even if the spline of each friction plate can only transmit a limited torque.

The present invention has been explained with reference to preferred embodiments thereof, but the present invention is naturally not limited to such embodiments and is subject to suitable modifications and variations. For example, there may be employed only one friction plate. Also the friction plate housing 233 is rendered axially movable with respect to the reducer input shaft 103, but both may be mutually connected for example with a radially penetrating pin.

As explained in the foregoing, in the electric power steering device of the present invention, the power transmission means having a friction face and pressure means pressed to said frictional face is provided between the rotary shaft of the motor and the reducing mechanism, so that the power transmission is achieved utilizing the relatively small frictional force generated between said frictional face and said pressure means before the output torque of said motor is amplified by said reducing mechanism. Consequently the power transmission means can be made simple and compact in configuration, as it is not necessary to increase the pressing force of the pressure means nor to increase the area of the frictional face.

What is claimed is:

1. An electric power steering device, comprising:

a housing;

a motor with a rotary shaft, mounted on said housing;

an output shaft adapted to be connected to a steering mechanism for steering wheels;

a reducing mechanism coupled to said output shaft; and power transmission means coupling said rotary shaft to said reducing mechanism and adapted to effect power transmission;

wherein said power transmission means includes a transmission shaft, a rolling bearing rotatably supporting said transmission shaft relative to said housing, and a frictional face and pressure means which are frictionally engaged to couple said transmission shaft to said rotary shaft to effect power transmission, said pressure means being pressed to said frictional face by a spring with a spring force which is predetermined to allow slippage between said frictional face and said pressure means when said transmission shaft is subjected to a force tending to counteract an output force of said motor;

said power transmission means further including a portion disposed to transmit pressing force of said pressure means to a ring of said rolling bearing to eliminate play of said rolling bearing.

2. An electric power steering device, comprising:

a housing;

a motor with a rotary shaft, mounted on said housing;

an output shaft adapted to be connected to a steering mechanism for steering wheels;

a reducing mechanism coupled to said output shaft and provided with an input member, said reducing mechanism being adapted to effect power transmission from said input member to said output shaft in a speed-reducing manner; and power transmission means coupling said rotary shaft to said reducing mechanism and adapted to effect power transmission;

wherein said power transmission means includes a friction plate housing which is non-rotatable relative to one of said rotary shaft and said input member, a friction plate contained in said friction plate housing and which is non-rotatable relative to the other of said rotary shaft and said input member but capable of movement in an axial direction relative thereto within said friction plate housing, and a pressure member contained in said friction plate housing and pressing said friction plate with a predetermined pressing force into frictional engagement with a stop surface which rotates with said friction plate housing, thereby enabling power transmission, said friction plate housing being configured such that said pressing force is not transmitted beyond said friction plate housing, and said pressing force being determined so as to allow slippage between said friction plate and said stop surface when said power transmission means is subjected to a force tending to counteract an output force of said motor.

3. An electric power steering device according to claim 2, wherein said power transmission means includes two of said friction plates which are pressed apart from one another, each into frictional engagement with a corresponding stop surface which rotates with said friction plate housing.

* * * * *